ALUN JOHN REED
INVENTOR
BY
ATTORNEY

United States Patent Office 3,478,160
Patented Nov. 11, 1969

3,478,160
VIBRATION ABSORBERS
Alun John Reed, Leicester, England, assignor to Metalastik Limited, Leicester, England, a British company
Filed June 23, 1967, Ser. No. 648,497
Claims priority, application Great Britain, July 6, 1966, 30,252/66
Int. Cl. H02g 7/14
U.S. Cl. 174—42    10 Claims

ABSTRACT OF THE DISCLOSURE

A vibration absorber for electrical overhead transmission line conductors of the kind comprising an absorber mass to be attached to a conductor by spring means has the center of gravity of the absorber mass offset from the effective center of suspension afforded to it by the spring means whereby the mass has at least two coupled modes of vibration at distinct frequencies.

---

Figure 1:
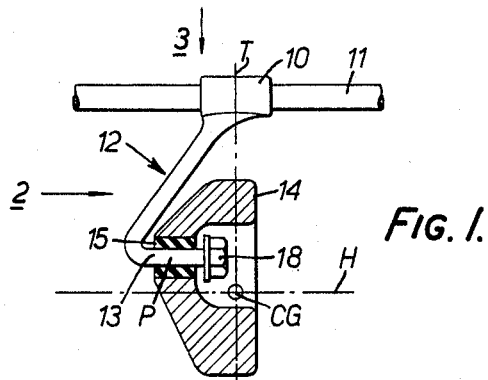

This invention comprises improvements in vibration absorbers. Vibration absorbers are known comprising an absorber mass which is arranged to be attached to a vibrating system by spring means, the mass being tuned so as to vibrate at a natural frequency in response to vibration of the system to absorb or suppress the amplitude of system vibrations of a predetermined frequency which excite the absorber mass. Such vibrations would be at or near the natural frequency of the absorber mass and the mass would be "tuned" so as to suppress system vibrations of a desired frequency.

In order to absorb aeolian vibrations of overhead electrical transmission line conductors to prevent or reduce the possibility of fatigue failure of the conductor strands particularly at the suspension points, it it common to employ vibration absorbers hung from the conductors. The absorber masses are tuned to respond to frequencies within the frequency range found to be most severe for aeolian vibrations. This is, typically, within the range of 5 to 30 c.p.s. and, typically, the absorber masses would be tuned so as to respond at frequencies of 10 c.p.s. and 30 c.p.s.

The object of the present invention is to provide a vibration absorber consisting of a single absorber mass which will respond to absorb or suppress the amplitude or vibrations in a vibrating system at more than one distinct frequency whereby the vibration absorber will act effectively to suppress vibrations of the system over a wider predetermined frequency range.

BRIEF SUMMARY OF THE INVENTION

Broadly, according to the present invention, there is provided a vibration absorber having a single absorber mass and resilient mounting means for suspending the absorber mass from a vibratory system characterized in that the effective center of suspension of the absorber mass provided by the mounting means is offset from the center of gravity of the absorber mass whereby the mass has at least two coupled modes of vibration at distinct frequencies. By a "coupled" mode of vibration is meant a vibration which is compounded out of a translational oscillatory movement and a rotational oscillatory movement of the absorber mass.

Taking every symmetrical case giving rise to a decoupled mode of vibration, an absorber mass may be regarded as having three modes of translational vibration in three planes mutually at right angles and each containing the center of gravity of the absorber mass, and three modes of rotational vibration about three axes mutually at right angles and each passing through the center of gravity of the absorber mass.

According to a feature of the present invention, the absorber mass is non-symmetrical about at least one plane containing the center of gravity of the absorber mass, optionally about two planes at right angles and each containing the center of gravity of the absorber mass and preferably non-symmetrical about three planes mutually at right angles and each containing the center of gravity of the absorber mass.

By so proportioning the mass that the mass is non-symmetrical in relation to all three of the planes mentioned in the preceding paragraph, it may be arranged that each of the six modes of vibration described in the next but one preceding paragraph is always coupled with one of the other modes of vibration described in the next but one preceding paragraph.

The degree of coupling and the extent to which each mode of vibration is excited by a particular form of disturbing force imposed upon the absorber mass by the vibratory system is dependent upon the relevant inertia and spring stiffness values of the resilient mounting means for the mode of vibration being considered.

By properly choosing the inertia and spring stiffness values, a vibration absorber according to the present invention may be made to work effectively to suppress a wide range of frequencies of the vibratory system to which it is connected, the vibration absorber having up to six resonant frequencies spread over a wide frequency range which are excited by the system to which it is attached and yet consisting of only a single absorber mass and, conveniently, the resilient mounting means including only a single spring for suspending the absorber mass from the vibratory system.

According to a further feature of the present invention, means may be incorporated in the vibration absorber to damp the vibrations of the absorber mass. Preferably, the resilient mounting means includes a spring means having inherent damping characteristics is used.

The accompanying drawings show, by way of example, a vibration absorber according to the invention for a conductor of an overhead electrical transmission line.

Figure 2:
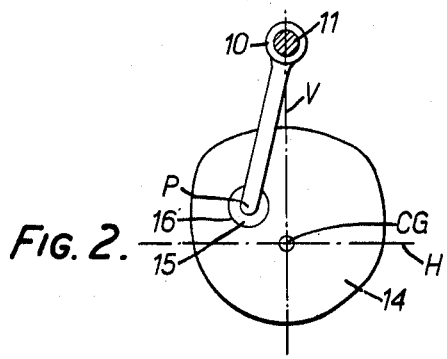
Figure 3:
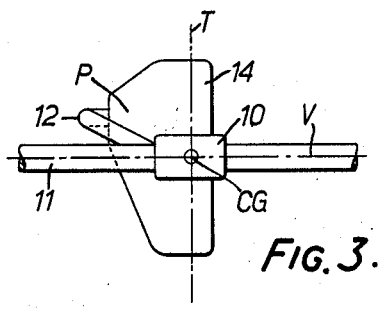

In the drawings:
FIG. 1 is a side elevation of the damper with certain parts in cross-section.
FIG. 2 is a view in the direction of arrow 2 in FIG. 1, and
FIG. 3 is a view in the direction of arrow 3 in FIG. 1.

Referring to the drawings, the vibration absorber comprises a conductor clamp 10 of any convenient form for securely and fixedly attaching the vibration absorber to a conductor 11. The clamp 10 is carried at the top end of an arm 12 which is cranked as at 13 so as to extend generally parallel with the conductor. The arm 12 supports at its lower end a single absorber mass 14 which is suspended on the arm by a spring means in the form of a single cylindrical rubber bush 15. The bush 15 is mounted on the crank 13 and in a bore 16 in the mass 14, the bush being held radially compresed in the bore by the crank 13 which is circular in cross-section and entered through the bore of the bush. The bush has a free end face at each end so that the rubber is free to bulge at each end. A nut 18 is screwed onto the end of the crank arm 13 and acts to trap the absorber mass on the arm should the rubber bush 15 fail.

The center of gravity (CG) of the absorber mass is at the position indicated in the various figures. The effective point of suspension (P) afforded to the mass 14 by the bush 15 is again positioned as indicated in the various figures.

In the example being described the CG of the mass 14 is positioned vertically below the longitudinal center line of the conductor 11, that is to say in a vertical longitudinal plane V. The point P is offset from the plane V, lies above the horizontal plane H through the CG of the mass 14 and to one side of the transverse plane T through the CG of the mass, the plane T being at right angles to the planes H and V.

The mass 14 is non-symmetrical about each of the planes V, H and T, as clearly indicated in the drawings.

The shape of the mass 14, the offset of the point P from the CG of the mass in relation to each of the planes V, H and T, and the stiffness ratios of the rubber bush axially, torsionally and conically are all variable in this construction to "tune" the absorber to respond to a number of distinct frequencies in the frequency range of 10 c.p.s. to 30 c.p.s. to suppress aeolian vibrations of the conductor 11.

Instead of using a cylindrical rubber bush 15 an elliptical bush or a conical or double conical bush might be used to introduce different stiffness ratios for the spring means.

As is well known, rubber spring means possesses inherent damping characteristics and the rubber bush 15 accordingly acts to damp out vibrations of the absorber mass 14.

If desired, the vibration absorber may be attached to the conductor with the CG of the mass 14 offset from the plane V. The effect of this is for the absorber to convert vertical vibrations of the conductor into torsional vibrations of the conductor which are more highly damped due to the construction of the conductor.

Where the CG of the mass 14 lies in the vertical plane V any horizontal components of conductor vibrations are damped in this fashion.

I claim:

1. A vibration absorber comprising:
   a single absorber mass which is non-symmetrical about three mutually orthogonal planes, each plane containing the center of gravity of the absorber mass; and
   means resiliently mounting said absorber mass to a vibrating system such that the center of gravity of said absorber mass is offset from the effective center of suspension of the absorber mass provided by said resilient mounting means, said absorber mass having at least two coupled modes of vibration at distinct frequencies.

2. A vibration absorber comprising:
   a single absorber mass; and
   resilient mounting and damping means including a rubber spring means for resiliently and dampedly mounting said absorber mass to a vibrating system such that the center of gravity of the absorber mass is offset from the effective center of suspension of the absorber mass provided by said resilient mounting means, said absorber mass having at least two coupled modes of vibration at distinct frequencies.

3. A vibration absorber as claimed in claim 2 wherein said single absorber mass is non-symmetrical about three mutually orthogonal planes, each plane containing the center of gravity of the absorber mass.

4. A vibration absorber as claimed in claim 2 wherein said rubber spring means is a rubber bush.

5. A vibration damper as claimed in claim 4 wherein said absorber mass has a bore therein and wherein said rubber bush is housed in radial compression in said bore.

6. A vibration absorber and damper for a vibrating system which includes a conductor of an electrical overhead transmission line, said vibration absorber and damper comprising:
   a single absorber mass; and
   means resiliently mounting said absorber mass to said vibrating system such that the center of gravity of said absorber mass is offset from the effective center of suspension of the absorber mass provided by said resilient mounting means, said resilient mounting means including:
      a cranked arm;
      a conductor clamp coupling said arm to said conductor, said clamp being oriented with respect to said arm so as to grip said conductor with the cranked portion of said arm remote from said clamp and extending substantially parallel with said conductor; and
      spring means mounting said absorber mass to the cranked portion of said arm.

7. A vibration absorber as claimed in claim 6 wherein said single absorber mass is non-symmetrical about three mutually orthogonal planes, each plane containing the center of gravity of the absorber mass.

8. A vibration absorber as claimed in claim 6 wherein:
   said spring means is a rubber bush which surrounds said cranked portion of said arm; said absorber mass has a bore therein; and
   said bush is housed in said bore.

9. A vibration absorber as claimed in claim 8 wherein said cranked portion of said arm includes means on its end to trap said absorber mass on said arm in the event said rubber bush fails.

10. A vibration absorber as claimed in claim 8 wherein said rubber bush is housed in radial compression in said bore and wherein said cranked portion of said arm includes means on its end to trap said absorber mass on said arm in the event that said rubber bush fails.

References Cited

UNITED STATES PATENTS

| | | | |
|---|---|---|---|
| 2,694,101 | 11/1954 | Shuhart | 174—42 |
| 2,745,896 | 5/1956 | Rostoker | 174—42 |
| 2,755,056 | 7/1856 | Hutton | 248—358 |
| 3,139,152 | 6/1964 | Bajer | 248—9 XR |
| 3,337,165 | 8/1967 | Kondo | 248—15 |
| 2,688,047 | 8/1954 | MacIntyre | 174—42 |
| 3,052,747 | 9/1962 | Clark et al. | 174—42 |

LARAMIE E. ASKIN, Primary Examiner

U.S. Cl. X.R.

188—1, 103; 248—358